C. C. BURROUGHS.
Corn Sheller.
No. 201,743. Patented March 26, 1878.
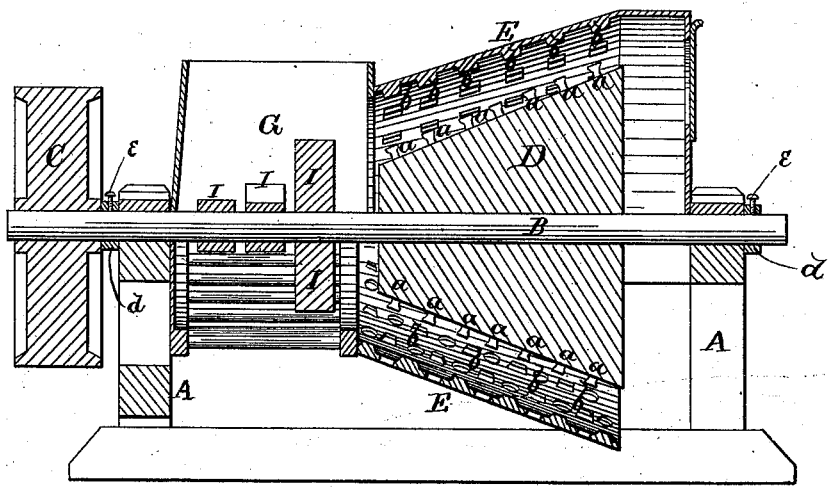
WITNESSES
Henry N. Miller
Frank Galt
INVENTOR
C. C. Burroughs,
Alexander & Mason
ATTORNEYS

UNITED STATES PATENT OFFICE.

CALEB C. BURROUGHS, OF DECATUR, ILLINOIS.

IMPROVEMENT IN CORN-SHELLERS.

Specification forming part of Letters Patent No. 201,743, dated March 26, 1878; application filed August 22, 1877.

*To all whom it may concern:*

Be it known that I, CALEB C. BURROUGHS, of Decatur, in the county of Macon, and in the State of Illinois, have invented certain new and useful Improvements in Corn-Shellers; and do hereby declare that the following is a full, clear, and exact description thereof, reference being had to the accompanying drawing, and to the letters of reference marked thereon, making a part of this specification.

My present invention is intended as an improvement upon the corn-sheller for which Letters Patent No. 184,756 were granted to me November 28, 1876; and the nature of my invention consists in a bell-shaped hopper, or a hopper with larger diameter at the bottom, in combination with beaters working in said hopper to assist in carrying down the corn.

It also consists in a solid conical cylinder surrounded by a casing, each having teeth and in different planes, in combination with beaters upon the cylinder-shaft arranged beneath a hopper, all as hereinafter more fully set forth.

In order to enable others skilled in the art to which my invention appertains to make and use the same, I will now proceed to describe its construction and operation, referring to the annexed drawing, which represents a longitudinal vertical section of my improved corn-sheller.

A represents the frame. B is the cylinder-shaft, operated through the pulley C. On the shaft B is secured a solid cone or conical cylinder, D, provided on its periphery with a series of teeth, *a a*, set in circular rows around the same. This cone or conical cylinder D is surrounded by a conical casing, E, provided with interior teeth *b b*, set in a corresponding manner to those on the outside of the cone D.

The opposite surfaces of the cone D and casing E are in different planes—or, in other words, they are inclined at different angles from the center, as shown in the drawing—so that their larger ends will be closer together than their inner or smaller ends.

On the cylinder-shaft are secured beaters or feeders I I, which work directly under the hopper G, as shown. These beaters or feeders prevent the corn from arching in the hopper, and prepare the corn for the cylinders by partially shelling and forcing the corn to the shelling-surfaces of the cylinder and casing. The hopper G is made bell-shaped, or has its lower end of larger diameter than the upper, whereby the corn is prevented from clogging in the hopper, and the hopper, by its formation, in fact, assists the beaters in carrying down the corn.

The shaft B and cone D are adjustable laterally in the casing, to give greater or less space between the cylinder and casing, and are held in place by means of collars *d d* and set-screws *e e*, as shown.

Having thus fully described my invention, what I claim as new, and desire to secure by Letters Patent, is—

1. In a corn-sheller, a bell-shaped hopper, or a hopper with larger diameter at the bottom than at the top, in combination with rotating beaters or feeders, for the purposes herein set forth.

2. The combination of the hopper diminishing in diameter toward the top, the feeders, and conical sheller, substantially as and for the purposes herein set forth.

In testimony that I claim the foregoing I have hereunto set my hand this 14th day of August, 1877.

CALEB C. BURROUGHS.

Witnesses:
S. F. GREER,
J. I. BEAR.